Patented June 16, 1953

2,642,347

UNITED STATES PATENT OFFICE 2,642,347

PRODUCTION OF SODIUM CARBIDE AND ACETYLENE

Harvey N. Gilbert, Niagara Falls, N. Y., assignor to E. I. du Pont de Nemours and Company, Wilmington, Del., a corporation of Delaware No Drawing. Application February 24, 1950, Serial No. 146,163

10 Claims. (Cl. 48—216)

This invention relates to the production of sodium carbide and of acetylene and more particularly to the production of a novel product containing sodium acetylide and the conversion of the latter into acetylene.

Metal carbides and acetylides react with water to produce acetylene and heretofore most acetylene has been produced commercially by reacting water with calcium carbide. Calcium carbide heretofore has been the cheapest available metal carbide suitable for the production of acetylene. One objection, however, to the calcium carbide process is the fact that the by-product, a calcium hydrate sludge, has little utility and for the most part is discarded. In the manufacture of large quantities of acetylene, thousands of tons of the lime sludge are produced which must be transported to some location and dumped.

It has long been recognized that production of acetylene by reacting water with sodium carbide would be advantageous in that the by-product, caustic soda, is a valuable article of commerce. However, heretofore, there has been no process for producing sodium carbide sufficiently cheaply to justify its use for the production of acetylene. It has been proposed to produce sodium carbide by reacting sodium vapor with carbon in an electric arc (German Patent 526,627), by reacting calcium carbide with sodium monoxide or sodium hydroxide (Vaughn U. S. P. 2,156,365) or by reacting metallic sodium with acetylene (British Patent 336,516 of 1930). None of these processes are in commercial use today.

An object of the present invention is to provide an economical process for the production of a sodium carbide product which is suitable for the production of acetylene and other purposes. A further object is to provide a method for producing acetylene in which the production of by-products having little or no value is avoided. Still other objects will be apparent from the following description of my invention.

This invention is based on my discovery that under proper operating conditions sodium can be made to react with carbon monoxide to produce sodium carbide in good yield according to the following exothermic reaction:

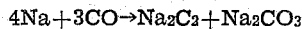

$$4Na + 3CO \rightarrow Na_2C_2 + Na_2CO_3$$

I have found that in order to carry out this reaction the reactants must be maintained at a temperature within the range of 600–850° C. The highest yield of carbide is obtained when the reaction temperature is within the range of 625–780° C. For example, this reaction may be carried out by placing sodium in a small steel container adapted to withstand pressure and introducing carbon monoxide, while shaking the container in a furnace where temperature conditions can be carefully controlled so as to maintain the contents within the above temperature range. The resulting novel product is a mixture of sodium carbide and sodium carbonate which is slightly fluid at the reaction temperature and when cooled to room temperature is a hard dense material. Under optimum reaction conditions the product is substantially white; otherwise it is gray or black due to some decomposition of the carbon monoxide to form free carbon. The product will contain from about 20% by weight (approximately 28 molar percent) up to 39.76% by weight (50 molar percent) of sodium carbide, the remainder being chiefly sodium carbonate, with or without some free carbon. In some cases, the product may also contain minor amounts of sodium or sodium monoxide and traces of sodium cyanide.

While the direct reaction between carbon monoxide and metallic sodium is capable of producing the above described sodium carbide product in good yield, a more economical and preferred method of producing it is to utilize a novel modification of the old De Ville process. The De Ville process, which formerly was utilized for the production of metallic sodium, consisted in heating together sodium carbonate and carbon to evolve a mixture of carbon monoxide and sodium vapors and condensing metallic sodium from the vapors. In practicing the De Ville process to produce metallic sodium, it is essential to cool the vapors quickly to temperatures below 400° C. If the mixture of sodium vapor and carbon monoxide is gradually cooled, the reaction reverses to form mainly sodium carbonate and carbon. Certain reversion products occurring in an experimental operation of the De Ville process have been reported to contain "carbides of sodium" but the report does not disclose the temperatures at which such reversion products were obtained.

To produce the above-described mixture of sodium carbide and sodium carbonate, I react sodium carbonate with carbon at a temperature of from 1050° C. to about 1200° C. to produce a gaseous mixture of carbon monoxide and sodium vapor and rapidly cool this gaseous mixture to a selected temperature within the range of 600 to 850° C., preferably within the range of 625 to 780° C. A preferred method of so cooling the gas mixture is to pass it into contact with a suitably preheated, heat conductive, solid surface. The result is the condensation of the sodium carbide-carbonate reaction product on the aforesaid surface. The product condenses on the surface in a semi-solid or pasty condition. On cooling to room temperature, it forms a hard, dense, enamel-like coating on the solid surface, which ordinarily is very difficult to remove.

If desired, after the carbide product has built up on the cooling surface to a sufficiently thick layer, e. g., 0.01 to 0.1 inch, it may be removed by some mechanical means such as chipping. However, I generally prefer not to remove the product but to utilize the coated surface in any desired process in which the sodium carbide serves as reactant. For example, I may pass water or steam into contact with the coated solid surface whereby the water reacts with the carbide forming acetylene gas, which may be collected. The solid surface then is left with a coating consisting of a mixture of caustic soda and sodium carbonate, which is not so adherent and which may be easily removed, either by mechanical means or by water solution. When steam is thus used to react with the carbide product to produce acetylene, practically all of the caustic soda-carbonate by-product remains on the surface. In this condition it may be treated with carbon dioxide to convert the caustic to carbonate; and after drying at a temperature below the fusion point of the carbonate, the latter may readily be removed from the solid surface by mild mechanical action.

Any material which is solid and chemically inert to the reactants and reaction products at the reaction temperature may be utilized for the condensation of the carbide-carbonate product. Such solid material may be in continuous form such as a sheet or a side wall of a container, for example, a steel container filled with a fused salt, molten metal or other suitable heat-exchange liquid, or it may be in a discontinuous form such as small particles or relatively large pieces of solid material, for example, graphite flakes, silicon carbide crystals, iron powder, steel shot, steel balls, or the like.

The invention is illustrated by the following examples.

Example 1

Sodium was placed in an iron container immersed in a molten salt bath maintained at a temperature of 850° C. and a stream of carbon monoxide at room temperature was bubbled through the liquid sodium. By this means, a reaction product was obtained which analyzed as follows:

Sodium carbide 33.9% by weight
Sodium carbonate 54.7% by weight

This product was a dense, hard, gray, solid which adhered to the walls of the vessel when cold and was removed by chipping.

Example 2

A mixture of 26 parts by weight of finely divided petroleum coke and 106 parts by weight of soda ash was heated in a steel reaction vessel in a gas fired furnace to maintain the temperature of the mixture at 1050 to 1100° C. The reaction vessel was provided with a steel vapor outlet pipe extending downwardly through the bottom of the furnace in such manner that the outlet pipe was heated by the furnace combustion gases. A cylindrical steel container, open at the top and provided with three peripherical slots $\tfrac{3}{16} \times 1\tfrac{5}{8}$ inches at the bottom was partly filled with steel balls $\tfrac{5}{16}$ inch in diameter. A thermocouple embedded in the balls was arranged to determine the temperature thereof. The container and balls then was heated in another furnace in a nitrogen atmosphere, to the "initial" temperature indicated in the table below. The heated container then was quickly arranged with its open end against the bottom of the furnace under the vapor outlet pipe, so that the latter extended into the container to within about 0.25 inch of the top layer of the balls. The effluent vapors issuing from the pipe at a temperature of 1050 to 1100° C. then passed through the mass of balls and thence out the peripherical openings in the ball container. When the temperature of the balls had risen to the "final" temperature shown in the table below, the ball container was removed and the balls were cooled to room temperature.

Each ball was coated with a hard, dense, dark gray coating about $\tfrac{1}{32}$ inch thick, which reacted rapidly with water or methanol to yield acetylene. On analysis, it was found to contain a mixture of sodium carbide, sodium carbonate, and carbon and a small amount of free sodium. In several trials at different ball temperatures, the following results were obtained:

| Ball Temperatures | | Sodium Carbide Content In Product (Percent by Weight) |
|---|---|---|
| Initial | Final | |
| °C. | °C. | |
| 450 | 680 | 32.1 |
| 530 | 725 | 30.6 |
| 620 | 695 | 19.0 |

Example 3

A cylindrical steel block, 3 inches high by 3 inches in diameter, formed with a dish-like depression in one end 2.75 inches in diameter by 0.5 inch deep, was heated to a temperature of 800° C. and placed below the furnace of Example 1, so that the issuing gaseous mixture of carbon monoxide and sodium vapor impinged against the dished end. After 10 minutes contact, the dished surface of the block was covered with a layer of condensed product and the temperature of the block had fallen to 740° C. The condensed product was enamel-like and when cold was a gray black, hard and dense solid. The product had the following composition:

| | Per cent |
|---|---|
| Sodium carbide | 30.2 |
| Sodium carbonate | 65.4 |
| Carbon | 4.4 |

In one preferred method I utilize steel balls, e. g., about 0.5 to 1 inch in diameter, as condensing surface. The steel balls are preheated to a suitable temperature, e. g., within the range of 400 to 600° C., and at that temperature are brought into contact with the mixture of carbon monoxide and sodium vapor resulting from the reaction of sodium carbonate with carbon at a temperature of 1050 to 1100° C. The heat liberated by the condensation of the carbide products is absorbed by the steel balls, raising their temperature. The balls are removed from contact with the reacting gases before the temperature of the balls reaches 850° C., preferably when the temperature has risen to 625 to 780° C. If desired, this process may be carried out in a continuous manner by passing the carbon monoxide and sodium vapor mixture continuously into a tower or other suitable container, through which a mass of the preheated steel balls is moved continuously or intermittently. By controlling the rate at which the balls move through such container, the temperature of the steel surface on which the product condenses may be very carefully controlled within very close limits.

After serving to condense the carbide product, the steel balls are coated with a thin layer of the product, which is hard, dense and enamel-like. Then the balls may be cooled to temperatures below 400° C. and contacted with steam, e. g., at about 1 to 10 lbs. gauge pressure, until the carbide has substantially completely reacted to form acetylene, and the resulting acetylene is collected by conventional means. Carbon dioxide is then passed through the mass of balls to convert the adherent sodium hydroxide carbonate mixture (by-product of the steam reaction) substantially entirely to carbonate. The balls may then be subjected to drying, although in some cases drying may not be necessary. The resulting carbonate coated balls then are fed into a rotating drum or other conventional means for mechanical agitation, which serves to break up and loosen the carbonate from the surface of the balls. The carbonate is separated from the balls by screening and may be recycled to the reaction with carbon. The balls are reheated and recycled to serve as condenser surface.

In this cyclic process, carbon monoxide is a by-product of the conversion of sodium carbonate into the mixture of sodium carbide and sodium carbonate, as not more than half of the monoxide formed by the reaction of carbon with the carbonate will react with the sodium vapor to form carbide. This is shown by the following equations:

$$2Na_2CO_3 + 4C \rightarrow 4Na + 6CO$$
$$4Na + 3CO \rightarrow Na_2C_2 + Na_2CO_3$$

A small part of the carbon monoxide may react to form carbon dioxide and carbon:

$$2CO \rightleftharpoons CO_2 + C$$

The almost three moles of CO thus released may be utilized, for example, as fuel to supply heat to the first reaction and a part may be oxidized to furnish the $CO_2$ required to convert the caustic by-product to carbonate.

By the above described cyclic process, wherein the sodium content of the entire system is converted first from sodium carbonate to elemental sodium, thence to a mixture of sodium carbide and sodium carbonate, thence by reaction with water to form acetylene and a mixture of carbonate and caustic soda, and finally by carbonation completely reverted to sodium carbonate, I thus produce acetylene utilizing as sole raw materials water (steam) and carbon. Thus, I may economically convert cheap forms of carbon such as coke or charcoal into acetylene without the formation of by-products other than carbon monoxide.

On the other hand, if desired, either caustic soda or a mixture of caustic soda and carbonate may be recovered from the process as a by-product. Thus, I may dissolve the mixture of by-product caustic soda and carbonate from the steel balls by treatment with water. The resulting solution may be concentrated to a solid state forming a solid mixture of caustic and carbonate which is a useful and valuable alkali for many industrial uses. Alternatively, the solution of caustic and carbonate may be causticized by treatment with lime and the resulting solution evaporated to produce caustic soda.

In place of the steel balls, other solid heat conductive bodies of similar size may be utilized, e. g., bodies having shapes similar to spheres, ellipsoids, cones, polyhedrons, cylinders, rings or irregular shapes. I prefer to utilize solid (as contrasted with hollow) bodies having a mass equal to that of a sphere not less than about 0.25 inch in diameter, in order to provide adequate heat capacity. For ease in handling, and to provide sufficient surface, the mass of such bodies should not exceed that of a sphere about 2 inches in diameter.

Instead of moving condensing surfaces such as the above-mentioned steel balls or other discontinuous surfaces, another preferred method utilizes stationary heat-exchange surface condensers, which may be of conventional type. Liquids such as molten metals or molten salts may be used as heat-exchange liquids to maintain the condensers at the desired reaction temperature, e. g., within the range of 625 to 780° C. By this means, the reaction temperature may be controlled within very narrow limits over extended periods of time. When the condensing surface of the heat-exchange condenser has become coated with the carbide product, the reactant gases may be diverted to another heat-exchange condenser. The solid material condensed out on the surface of the first condenser then may be reacted by passing steam therethrough to form acetylene and, if desired, $CO_2$ thereafter may be passed through the condenser to carbonate the caustic by-product. Finally, carbonate may be removed from the surfaces of the condenser either by passing in a solvent such as water to dissolve it or by mechanical means such as shaking or scraping, depending upon the construction of the condenser.

In other continuous methods I may pass in contact with the reacting vapors continuous, heat conductive solid surfaces which are in motion, such as strands of chain, wire or the like, continuous lengths of sheet material or rotating bodies such as disks or wheels. I generally prefer to use steel as the material of the condensing surface as this has adequate heat-exchange properties and has the durability required for commercial operation. The steel may be of any known type, whether plain carbon steel or alloy steels such as stainless (chrome) steels, tool steels or the like.

Whatever method is employed to cool the gases, or to control the temperature of reaction between the carbon monoxide and sodium to produce the carbide-containing product, the aforementioned temperature range is essential and critical, in order to obtain a product containing at least about 20% by weight of sodium carbide. It is also important to reduce the temperature of the reactants as rapidly as possible from around 1100° C. to 600 to 850° C. If the temperature falls below 400° C., metallic sodium is formed instead of the carbide. At temperatures of 850 to 1100° C., the product is mainly sodium carbonate and free carbon. The formation of carbonate and carbon also occurs at the expense of carbide formation when the reduction of temperature is slow.

When steel balls around 0.25 to 1 inch in diameter are used as cooling surface, the balls may be heated to a temperature below 600° C., e. g., 350 to 575° C., before contacting them with the reactant gases. Although at this relatively low temperature, a small amount of sodium is formed on the initial contact of the gases with the balls, the surface temperature quickly rises to above 600° C. and the bulk of the reacttion occurs between 600 and 850° C., resulting in a good yield of carbide. With more massive pieces of metal as condensers, e. g., balls 2 to 3 inches in diameter, the best results are obtained by preheating to temperatures within the range of 600 to 800° C. When finely divided materials are used, cooling surfaces, e. g., iron powder, flake graphite or the like, preheating is not essential, as the small particles are very rapidly brought up to reaction temperature. Such materials also must remain in contact with the hot reacting gases only a very short time, on the order of a few seconds or less, depending on their heat conductivity and particle size, to avoid heating them to above 850° C. A convenient method is to permit a shower of such finely divided material to fall by gravity, either freely or down an inclined slope, through the hot mixture of carbon monoxide and sodium vapor.

As will be obvious to chemists, the novel product of my invention, the intimate mixture of sodium carbide and sodium carbonate, may be utilized for various purposes other than reacting it with water to form acetylene. For example, it may be reacted with an alcohol such as ethanol or methanol to simultaneously form acetylene and the corresponding sodium alcoholate. It may also be used for pack hardening of steel by heating an iron part in the powdered product. The product may also be used as a raw material for the preparation of organic acetylenic compounds. The sodium carbide-carbonate mixture can be employed as a reducing agent in fused melts such as in a glass bath to reduce iron and in various metallurgical operations where reducing conditions are required. The carbide product also may be utilized to produce metallic sodium merely by heating it in an inert atmosphere, e. g., nitrogen, to a temperature of 900 to 1000° C. to decompose the carbide and form sodium vapor which may be condensed.

I claim:

1. A process which comprises reacting sodium carbonate with carbon at a temperature of from 1050° C. to about 1200° C. and contacting the resulting gaseous mixture of carbon monoxide and sodium vapor with a mass of steel bodies, each having a mass equal to that of a steel sphere of about 0.25 to 2 inches in diameter, said bodies being maintained at a temperature of 625 to 780° C.

2. A process which comprises reacting sodium carbonate with carbon at a temperature of from 1050° C. to about 1200° C. and contacting the resulting gaseous mixture of carbon monoxide and sodium vapor with a mass of steel balls of about 0.5 to 1 inch in diameter, said balls being maintained at a temperature of 625 to 780° C.

3. A process for the production of acetylene which comprises reacting sodium carbonate with carbon at a temperature of from 1050° C. to about 1200° C., cooling the resulting gaseous mixture of carbon monoxide and sodium to a temperature of 600 to 850° C., and reacting the resulting solid carbide-containing product with water.

4. A process for the production of acetylene which comprises reacting sodium carbonate with carbon at a temperature of from 1050° C. to about 1200° C., passing the resulting gaseous mixture of carbon monoxide and sodium vapor into contact with a solid, heat conductive surface maintained at a temperature of 600 to 850° C. until a coating of a carbide-containing product is formed on said surface and thereafter reacting said coating with water and collecting the resulting acetylene.

5. A process for the production of acetylene which comprises heating a mixture of sodium carbonate and finely divided carbon to a temperature of 1050° C. to about 1200° C., passing the resulting gaseous mixture of carbon monoxide and sodium vapor into contact with a mass of heated steel balls of about 0.5 to 1 inch in diameter, maintained at a temperature of 625 to 780° C. until a coating of sodium carbide is formed on said balls, contacting the so coated balls with water and collecting the resulting acetylene.

6. A process for the production of acetylene which comprises heating a mixture of sodium carbonate and finely divided carbon to a temperature of 1050° C. to about 1200° C., passing the resulting gaseous mixture of carbon monoxide and sodium vapor into contact with a mass of heated steel balls of about 0.5 to 1 inch in diameter maintained at a temperature of 625 to 780° C., until a coating of sodium carbide is formed on said balls, contacting the so coated balls with water and collecting the resulting acetylene, thereafter treating said balls with carbon dioxide until the residual coating thereon is substantially entirely converted to carbonate, separating the resulting carbonate from the balls, recycling the carbonate of the aforesaid reaction with carbon, and reheating and recycling said balls.

7. A process for the production of acetylene which comprises heating a mixture of sodium carbonate and carbon to a temperature of 1050° C. to about 1200° C., passing the resulting gaseous mixture of carbon monoxide and sodium vapor into contact with a mass of steel balls which have been preheated to a temperature of 350° C. to about 600° C., disestablishing contact between said gaseous mixture and said balls when the temperature of said balls has risen to 625 to 780° C., then passing steam in contact with said balls until the product thereon has reacted to form acetylene, collecting the resulting acetylene, then treating said balls with carbon dioxide until the residual coating thereon has been substantially completely converted to carbonate, separating the resulting carbonate from said balls, recycling the separated carbonate to reaction with carbon and reheating and recycling said balls.

8. A solid heat conducting body coated with an adherent layer of a hard, dense, intimate mixture of sodium carbide and sodium carbonate containing from about 20% to 39.76% by weight of sodium carbide.

9. A steel article coated with an adherent layer of a hard, dense, intimate mixture of sodium carbide and sodium carbonate containing from about 20% to 39.76% by weight of sodium carbide.

10. Spherical steel bodies each having a mass equal to 0.25 to 2 inches in diameter and each being coated with an adherent layer of a hard, dense, intimate mixture of sodium carbide and sodium carbonate containing from about 20% to 39.76% by weight of sodium carbide.

HARVEY N. GILBERT.

References Cited in the file of this patent

UNITED STATES PATENTS

| Number | Name | Date |
|---|---|---|
| 2,162,619 | Lacy | June 13, 1939 |

OTHER REFERENCES

Mellor, "A Comprehensive Treatise on Inorganic and Theoretical Chemistry," vol. 5, pp. 847, 848. Longmans, Green and Co., London, 1924.

Roscoe and Schorlemmer, "A Treatise on Chemistry," vol. 2, page 273, 4th Ed. 1907, MacMillan and Co., London.